US010882751B2

(12) United States Patent
Shahsavari et al.

(10) Patent No.: US 10,882,751 B2
(45) Date of Patent: Jan. 5, 2021

(54) CALCIUM-SILICATE-BASED POROUS PARTICLES, COMPOSITION, METHOD OF MAKING AND USE THEREOF

(71) Applicant: C-CRETE TECHNOLOGIES LLC, Stafford, TX (US)

(72) Inventors: Rouzbeh Shahsavari, Houston, TX (US); Joseph B. Miller, Houston, TX (US); Anil Desireddy, Houston, TX (US); Kazuhiro Yamato, Houston, TX (US)

(73) Assignee: C-Crete Technologies, LLC, Houston, TX (US)

( * ) Notice: Subject to any disclaimer, the term of this patent is extended or adjusted under 35 U.S.C. 154(b) by 435 days.

(21) Appl. No.: 15/280,649

(22) Filed: Sep. 29, 2016

(65) Prior Publication Data

US 2017/0088431 A1 Mar. 30, 2017

Related U.S. Application Data

(60) Provisional application No. 62/234,230, filed on Sep. 29, 2015.

(51) Int. Cl.
*C01B 33/24* (2006.01)
*C04B 24/02* (2006.01)
(Continued)

(52) U.S. Cl.
CPC .............. *C01B 33/24* (2013.01); *B05D 1/30* (2013.01); *C04B 18/027* (2013.01);
(Continued)

(58) Field of Classification Search
None
See application file for complete search history.

(56) References Cited

U.S. PATENT DOCUMENTS

2007/0110783 A1  5/2007  Pildysh
2008/0305027 A1* 12/2008  Johnston ................ B01D 53/02
                                                    423/339
(Continued)

FOREIGN PATENT DOCUMENTS

WO   2005113467 A1   12/2001
WO   2015171745 A1   11/2015

OTHER PUBLICATIONS

Allen, 'Polymer interfaces: structure and strength', Richard P. Wool. Carl Hanser Verlag, Munich, Vienna, New York, 1995. pp. xvii + 494, price DM 178.00, £72.00. ISBN 3-446-16140-6. Polymer International 1995, 38 (3), 305-306.
(Continued)

*Primary Examiner* — Ronak C Patel
(74) *Attorney, Agent, or Firm* — Gregory L. Porter; Hunton Andrews Kurth LLP

(57) ABSTRACT

A method for synthesizing calcium-silicate-based porous particles (CSPPs) is described. Control over CSPP morphology and pore size is achieved through a refined solution-based synthesis, allowing loading of a variety of sealants. These particles, upon external stimuli, release the loaded sealant into the surrounding material. Methods of loading the CSPPs with loading sealant are described. The CSPPs may be used in pure form or mixed with another material to deliver self-healing, sealing and multi-functional properties to a physical structure. The composition of the CSPPs is described, along with methods of use of the CSPPs.

18 Claims, 7 Drawing Sheets

(51) Int. Cl.

| | | |
|---|---|---|
| *C04B 24/12* | (2006.01) | |
| *E01C 11/00* | (2006.01) | |
| *C04B 28/06* | (2006.01) | |
| *C09K 8/467* | (2006.01) | |
| *B05D 1/30* | (2006.01) | |
| *E01C 23/00* | (2006.01) | |
| *C04B 22/00* | (2006.01) | |
| *C04B 28/04* | (2006.01) | |
| *C04B 20/00* | (2006.01) | |
| *C04B 18/02* | (2006.01) | |
| *C04B 111/00* | (2006.01) | |
| *C04B 111/72* | (2006.01) | |
| *E04G 23/02* | (2006.01) | |
| *E21B 33/138* | (2006.01) | |

(52) U.S. Cl.
CPC ............ *C04B 20/004* (2013.01); *C04B 22/00* (2013.01); *C04B 24/023* (2013.01); *C04B 24/121* (2013.01); *C04B 28/04* (2013.01); *C04B 28/06* (2013.01); *C09K 8/467* (2013.01); *E01C 11/005* (2013.01); *E01C 23/00* (2013.01); *B05D 2430/00* (2013.01); *C01P 2004/34* (2013.01); *C01P 2004/61* (2013.01); *C01P 2004/62* (2013.01); *C01P 2004/64* (2013.01); *C01P 2006/16* (2013.01); *C04B 2111/0075* (2013.01); *C04B 2111/00474* (2013.01); *C04B 2111/72* (2013.01); *C09K 2208/10* (2013.01); *E04G 23/0203* (2013.01); *E21B 33/138* (2013.01)

(56) References Cited

U.S. PATENT DOCUMENTS

| | | |
|---|---|---|
| 2009/0068272 A1 | 3/2009 | Bandyopadhyay |
| 2014/0287236 A1 | 9/2014 | Fuji et al. |

OTHER PUBLICATIONS

Dry et al., 'In Passive smart self-repair in polymer matrix composite materials', (1993), pp. 438-444.
Brown et al., "Fatigue crack propagation in microcapsule-toughened epoxy", J Mater Sci 2006, 41 (19), 6266-6273.
Li et al., "Preparation of mesoporous calcium doped silica spheres with narrow size dispersion and their drug loading and degradation behavior", Microporous and Mesoporous Materials 2007, 102 (1-3), 151-158.
Wu et al., "Bioactive mesoporous calcium-silicate nanoparticles with excellent mineralization ability, osteostimulation, drug-delivery and antibacterial properties for filling apex roots of teeth", Journal of Materials Chemistry 2012, 22 (33), 16801-16809.
Brown et al., "Microcapsule induced toughening in a self-healing polymer composite", J Mater Sci 2004, 39 (5), 1703-1710.
White et al., "Autonomic healing of polymer composites", Nature 2001, 409 (6822), 794-797.
Yang et al., "A self-healing cementitious composite using oil core/silica gel shell microcapsules", Cement and Concrete Composites 2011, 33 (4), 506-512.
Jackson et al., "Silica-Protected Micron and Sub-Micron Capsules and Particles for Self-Healing at the Microscale", Macromolecular rapid communications 2011, 32 (1), 82-87.
Dry, "Procedures developed for self-repair of polymer matrix composite materials", Composite Structures 1996, 35 (3), 263-269.
Pang et al., "A hollow fibre reinforced polymer composite encompassing self-healing and enhanced damage visibility", Composites Science and Technology 2005, 65 (11), 1791-1799.
Das et al., "Nanomaterials for Construction Engineering—a Review".
Kirk et al., "Self-healing epoxy composites based on the use of nanoporous silica capsules", International Journal of Fracture 2009, 159 (1), 101-102.
Zhang et al., "Surfactant-assisted sonochemical synthesis of hollow calcium silicate hydrate microspheres for drug delivery," 17 Ultrasonics Sonochem. (Jan. 2010), pp. 789-792.
PCT Search Report & Written Opinion (PCT/US 2016/054504), dated Dec. 16, 2016.
Fan et al., "Effects of adsorbed and templated nanosilver in mesoporous calcium-silicate nanoparticles on inhibition of bacteria colonization of dentin", 9 Int'l J. Nanomed. (2014), pp. 5217-5230.
Xia et al.,"Preparation and the phase transformation behavior of amorphous mesoporous calcium silicate", 108 Microporous and Mesoporous Mater. (2008), pp. 345-351.
Qi et al., "Preparation and evaluation of a mesoporous calcium-silicate material (MCMS) from coal fly ash for removal of Co(II) from wastewater", 279 Chem. Engineer. J. (2015), pp. 777-787.
Partial Supplementary EPO Search Report (EP 16852619.2), dated Mar. 29, 2019.

\* cited by examiner

Loaded CSPPs After Injection

Released Sealant & CSPPs After Stimulus

US 10,882,751 B2

CALCIUM-SILICATE-BASED POROUS PARTICLES, COMPOSITION, METHOD OF MAKING AND USE THEREOF

This application claims priority to U.S. Provisional Patent Application Ser. No. 62/234,230, filed Sep. 29, 2015. The entirety of the aforementioned application is incorporated herein by reference.

This invention was made with Government support under the contract number FE0026511 awarded by the Department of Energy. The Government has certain rights in this invention.

FIELD

This application generally relates to calcium-silicate-based porous particles (CSPPs) that may be loaded with a functional agent (such as a sealant) and used in a variety of applications, including, but not limited to, self-healing and sealing material applications, filling cracks in hydraulic fracturing, and controlled- and desired-release of materials upon exposure to stimuli. More specifically, this application relates to a method of synthesizing the CSPPs, the composition of the CSPPs, and their methods of use.

BACKGROUND AND SUMMARY OF THE INVENTION

The idea of producing inanimate materials with the ability to seal or self-heal is a topic of high interest in both the scientific and industrial communities. Self-healing materials can offer numerous advantages including reduced maintenance, higher durability, reduced long-term costs, and persistent strength. In nature, there are many instances that demonstrate the usefulness of self-healing, including plants that demonstrate harmonized cellular growth to renew damaged sites, and starfish that can regrow damaged or lost arms. It is only natural to try and apply these beneficial self-healing characteristics to lifeless materials, especially structural materials.

One of the most common methods used in an attempt to synthesize structures with the ability to repair themselves is to incorporate a self-healing component into a matrix material. This has been tried with moderate success in a number of ways including using fluid-filled fibers embedded in a polymer matrix that respond to thermo-mechanical stress or spheres filled with a self-healing fluid which releases upon crack development.

There are a variety of self-healing templates that have been experimented with including using polymer- and catalyst-filled microcapsules which upon exposure to a crack will rupture, composite filled tubes (usually glass) that can break when exposed to external stress, etc. Although there has been significant research on porous materials and particular silica particles, these materials are focused on drug delivery and similar applications. Recently there have been some developments on calcium silicate particles, but this research is focused on drug delivery and biological repairs and has not been able to demonstrate the fine control over the material's properties which is crucial for self-healing and/or sealing applications. In view of the limited success in delivering self-healing and/or effective sealing properties in material structures, there is a need for effective new approaches in this context.

The synthesis of calcium-silicate-based porous particles and successful loading and unloading/release of the sealant provides refined porous particles as new carriers for sealants. These hybrid particles are able to act as self-healing agents for a range of applications, such as cementitious materials, due to the inherent bonding nature of the loaded sealant and CSPPs. CSPPs will promote advancements in several areas including but not limited to building infrastructure, roads, highways, cementing oil and gas wells, proppants, filling cracks after hydraulic fracturing, and numerous other application where durable and multifunctional materials are needed.

One aspect of the present application relates to a refined synthesis of porous calcium-silicate-based particles with controlled size, wherein the controlled size is between 50 nm-2 microns in average diameter, and the particle composition comprises calcium silicates with calcium to silicon atomic ratios from 0.05 to 2.0, and the particle composition comprises pores of 1-50 nm in average diameter and the particles are spherical in shape, and further wherein the size of the average diameter of the particles is uniform within a standard deviation of about 6%. In certain embodiments, the controlled size is between 100-1000 nm in average diameter. In certain embodiments, the particles are 200-500 nm in average diameter and the pores are 5-30 nm in average diameter. In certain embodiments, multiple different pore sizes can be created on the same particle.

In certain embodiments, the composition comprises dual-sealants, wherein the dual sealants are a thermoset polymer sand a reactant. In certain embodiments, the composition comprises dual-sealants, wherein the dual sealants are epoxy and a hardener. In certain embodiments, the composition comprises dual-sealants, wherein the dual sealants are epoxy and a catalyst. In certain embodiments, the composition comprises triple-sealants, wherein the triple sealants are epoxy, a hardener and a catalyst. Examples of epoxy resins are any epoxy resins as long as they contain two or more epoxy group per molecule (e.g., Bisphenol A diglycidyl ether, resorcinol diglycidyl ether, Tris(4-hydroxyphenyl) methane triglycidyl ether, 4,4'-Methylenebis(N,N-diglycidylaniline), napthalene epoxy resins, novolac epoxy resins and combination thereof). Examples of hardeners are any primary amines or any molecules that contain two or more secondary amine or thiol (e.g., m-xylylenediamine, hexamethylenediamine, ethylenediamine, dimethylethylenediamine, triethylenetetramine, tris(2-aminoethyl)amine, 1,2-ethanedithiol, 1,3-propanedithiol, cysteine, 2-aminothiol, dithiolenethiol. Examples of catalysts are any tertiary amines and heterocyclic bases (eg. dimethylbenzylamine, triethylamine, diisopropylethylamine, imidazole, triazole, and combination of thereof). In other embodiments, any epoxy sealant may be used. In certain embodiments, the composition comprises dual-sealants wherein the dual sealants are isocyanates and reactants. Examples of isocyanates are any isocyanates as long as they contain two or more isocyanate group per molecule such as hexamethylenediisocyanate, m-xyleneisocyanate, 4,4'-oxybis(phenyl isocyanate, 1,6-Diisocyanato-2,2,4-trimethylhexane, 3,3'-Dichloro-4,4'-diisocyanato-1,1'-biphenyl and combination thereof. Isocyanates synthesized from carboxylic acid, amide, amine, hydroxamic acid and combination thereof may also be used. Examples of reactants are any molecules that contain two or more of following functional groups which are primary amine, secondary amine, primary hydroxy, secondary hydroxy, phenol, thiol and combination thereof (e.g., ethylenediamine, propylene diamine, N,N'-dimethylethylenediamine, 2-hydroxyethylamine, ethylene glycol, propylene glycol, 2-mercaptethanol, 2-mercaptamine and combination thereof). In certain embodiments, the composition comprises dual-sealants wherein the dual sealants are cyclic carboxylic anhydride and primary amines. Cyclic carboxylic anhydride are any molecule containing two or more cyclic carboxylic anhydride (e.g., phthalic anhydride, 1,4,5,8-naphthalenetetracarboxylic dianhydride, Perylene-3,4,9,10-tetracarboxylic dianhydride. Primary amines are any primary amines as long as they contain two or more primary amino groups per molecule (e.g., ethylenediamine, propylenediamine, hexamethylene diamine, xylenediamine, tris(2-aminoethyl)amine and combination thereof). In certain embodiments, the composition comprises dual-part sealants wherein one part is maleimides and the other part is thiols. Examples of maleimides are any molecules as long as they contain two or more maleimide functional group per molecule. Examples of thihols are any thiols as long as they contain two or more thiols (e.g., 1,2-ethanedithiol, 1,3-propanedithiol, dithiothreitol) and combination thereof. In certain embodiments, the composition comprises dual-sealants, wherein the dual sealants are melamine and a reactant.

In certain embodiments, stimuli such as pH and temperature responsive polymers or their monomers and initiators can be used for sealants. The sealants of the loaded particles can be released by external stimuli such as temperature, pH change, crack penetration, stress, and light. Examples of stimuli-responsive polymers are any polymers or any type of co-polymers (e.g., random, alt, block, graft) derived from vinyl or divinyl monomers from acrylic acid, methacrylic acid and any of their ester and amide derivatives, acrylonitrile, maleic acid and their amicacid, ester, amide, anhydride, imide derivatives with organic amines, alcohols, and the combination thereof. Those monomers may be also co-polymerized with any other olefin and vinyl monomers such as styrene, ethylene, propylene, isoprene, butadiene and their alkyl or other derivatives and combination thereof. In certain embodiments, other shapes can be produced for the particles, such as sheets or rhombohedral particles. In other embodiments, the shape of the particles is changed by changing the surfactant used in synthesis. In certain embodiments, synthesis procedure allows for controlled particle size, composition, porosity, and shape. The temperature of mixing and mixing time, etc, may have the ranges discussed herein below; both the temperature and time of mixing have an effect on the particle size and the pore size.

Another aspect of the present application relates to a composite material that can be 'programmed' with different loaded sealants that respond to various external stimuli, such as temperature, pH, chemical composition, and/or pressure change(s), crack penetration, light, magnetic and/or electric field, moisture, hydrocarbons, $CO_2$, and the combination thereof. The programmability is a result of the controlled particle and pore size in combination with the loaded sealant(s) type, which act together to be able to target specific applications, e.g., specific crack sizes, environmental temperatures, compositions and pH, and pressures and so on. In some embodiments, the composite material is a one-part system with particles loaded with only one sealant. In other embodiments, the composite material is a dual-part system with a subset of particles loaded with one sealant and another subset loaded with its reactant/hardener/accelerator/catalyst counterpart which react when opposite parts reach each other. As such, once the bulk material is exposed to external stimuli such as heat, pH, stress, light, crack, moisture, magnetic field, electric field, $CO_2$ (gas and/or liquid hydrocarbons), hydrocarbons or a combination thereof, the loaded sealant can be released into the surroundings to provide self-healing and/or sealing properties. In other embodiments, the composite material is a dual-part system wherein one part is the particles loaded with sealants and the other part (e.g., hardener) is put in slurry solution or is the liquid (fluid) itself. In other embodiments, the composite material is a dual-part system wherein one part is the particles loaded with hardener and the other part (e.g. sealant) is put in slurry solution or is the liquid (fluid) itself. In certain embodiments, calcium-silicate-based functionalized porous particle-sealant composite material eliminates the use of separate hardener or hardener loaded particles in creation of composite material. The functional particles acts as hardener for the sealant.

In some embodiments, the calcium-silicate-based porous particles can be utilized for any application that is exposed to damaging external stresses or applications that can benefit from a strong-bonding, self-healing material, sealing materials, lightweight materials, and the combination thereof.

In some embodiments, one type of the CSPPs are cement-based and provide an inherent ability to self-bond to many materials in the presence of a fluid such as aqueous fluids.

In certain embodiments, the composition is effective as a pure material. In certain embodiments, the composite material is poured into a mold, exposed to external stimuli, such as heat, and a new pure composite material is produced.

In other embodiments, the composition is additive to an appropriate host material/matrix. In certain embodiments, a method of addition includes combining the composite with an appropriate host material/matrix, and then stirring to achieve a homogeneous matrix; polymer loaded particles can be mixed with cement such as Portland cement (type I, II, III, IV and V and white cement), well cement (class A, B, C, G and H), calcium-aluminate cement, the combination thereof, or any other cementitious material as host material/matrix and then used in, for example, buildings, highways, roads, other infrastructures, well cementing and refractory materials.

In certain embodiments, a method of synthesizing particles is based on using cementitious elements such as calcium and silicon with controlled size, morphology, and composition: mixing a synthesized base and surfactant with solvent(s), wherein the mixture is stirred and/or heated for a specific amount of time, wherein after a specific amount of stirring and/or heating, the mixture is further heated or cooled, adding a calcium source and/or silicon source to a homogenous solution of base and surfactant, wherein the mixture is stirred and/or heated for a specific amount of time, retrieving the product from a reacted solution of base, surfactant, calcium and/or silicon source, and solvent(s), removing the substantial amount of the surfactant from the retrieved product to obtain the final CSPPs.

In certain embodiments, the base is selected from the group consisting of ammonium hydroxide, sodium hydroxide, potassium hydroxide, amino acids, other bases, acids and combinations thereof. In certain embodiments, the base concentration is in the range of 0.001-10 M.

In certain embodiments, the surfactant is selected from the group consisting of cetyltrimethylammonium bromide (CTAB), dodecyltrimethylammonium bromide (DTAB), decyltrimethylammonium bromide, Pluronic® F127, Pluronic® F68, zwitterion surfactants, anionic surfactants, or other similar surfactant, and combinations thereof. In certain embodiments, the surfactant concentration is in the range of 0.1-100 mM.

In certain embodiments, the solvent(s) is selected from the group consisting of water, tert-butanol, 1- and 2-butanol, 1- and 2-propanol, ethanol, methanol, acetone, acetonitrile, and combinations thereof. In certain embodiments, the base, surfactant, and solvent(s) mixture is stirred between 1-15000 rpm. In some embodiments, stirring is performed at 100-

1500 rpm or, if need be, 1 rpm stirring could be performed for a prolonged period of time. In certain embodiments, the temperature of the base or acid, surfactant, and solvent(s) mixture is adjusted between 1-100° C. as required to produce different specific types of particles. In particular embodiments, a reaction carried out at 1° C. can be used to obtain a different size particle with different porosity from a reaction carried out at room temperature, or from a reaction carried out at higher temperature. In certain embodiments, the base or acid, surfactant, and solvent(s) mixture is stirred, heated, or both for a time between 1-14400 minutes. In certain embodiments, the stirred/heated base or acid, surfactant, and solvent(s) mixture is further heated to a temperature between 1-100° C. In certain embodiments, the stirred/heated base or acid, surfactant, and solvent(s) mixture is further cooled to a temperature between 1-100° C.

In certain embodiments, the calcium source is selected from the group consisting of calcium nitrate, calcium chloride, calcium oxide, calcium salt, other calcium (2+) ion sources, or any other hydrated version of these sources, and combination thereof. In certain embodiments, the calcium source concentration is in the range of 0.1-300 mM.

In certain embodiments, the silicon source is selected from the group consisting of tetraethyl orthosilicate (TEOS), tetramethyl orthosilicate (TMOS), or similar tetraalkoxy orthosilicate, potassium metasilicate, sodium metasilicate, functionalized form of above silicon sources such as (3-aminopropyl)triethoxysilane (APTES), or any other hydrated version of these sources, and combination thereof. In certain embodiments, the silicon source concentration is in the range of 0.1-500 mM. In certain embodiments, the base, surfactant, solvent(s), calcium and/or silicon source mixture is stirred at 1-15000 rpm. In certain embodiments, the base, surfactant, solvent(s), calcium and/or silicon source mixture is heated to a temperature between 1-100° C. In certain embodiments, the base, surfactant, solvent(s), calcium and/or silicon source mixture is stirred and/or heated for a time between 1-14400 minutes. In certain embodiments, the product is retrieved via centrifuging the base, surfactant, calcium and/or silicon source, and solvent(s) mixture. In certain embodiments, the surfactant is removed from the product by heating in an atmosphere to a temperature between 200-800° C. In certain embodiments, the heat is applied for a time between 1-14400 minutes. In certain embodiments, the atmosphere is selected from the group consisting of air, nitrogen, argon, and combinations thereof. In certain embodiments, the final product is calcium-silicate-based particles with average diameters ranging from 1-2000 nanometers. In certain embodiments, the final product is a calcium-silicate-based particle with pores ranging in average diameter from 1-50 nanometers.

Another aspect of the application is a method of loading the final CSPPs by mixing the CSPPs with excess sealant and/or an excess sealant/solvent(s) mixture, wherein the mixture is stirred and/or heated for a specific amount of time, wherein after a specific amount of stirring and/or heating, and the mixture is cooled, then the product is retrieved from the cooled CSPP-sealant[-solvent(s)] mixture. In certain embodiments, the sealant is selected from the group consisting of epoxy, isocyanate, carboxylic anhydride, polymer, initiator, hardener, reactant, catalyst, and any combinations thereof. In certain embodiments, loading may involve two steps in the case of a two-part sealant where each ingredient needs to be loaded separately. In certain embodiments, the CSPP and sealant or CSPP, sealant, and solvent(s) mixture is stirred between 1-15000 rpm. In certain embodiments, the CSPP and sealant or CSPP, sealant, and solvent(s) mixture is heated between 1-400° C. In certain embodiments, the CSPP and sealant or CSPP, sealant, and solvent(s) mixture is stirred, heated, or both for time between 1-14400 minutes. In certain embodiments, the stirred/heated CSPP and sealant or CSPP, sealant, and solvent(s) mixture is cooled to a temperature between 1-100° C. In certain embodiments, the product is retrieved by initially heating the CSPP, sealant, and solvent(s) mixture at 1-400° C. In certain embodiments, the heat is applied for 0.5-480 hours. In certain embodiments, the product is retrieved via centrifuging the cooled CSPP and sealant or CSPP, sealant, and solvent(s) mixture. In certain embodiments, the product is retrieved via filtering the CSPP and sealant or CSPP, sealant, and solvent(s) mixture.

DETAILED DESCRIPTION

The following detailed description is presented to enable any person skilled in the art to make and use the invention. For purposes of explanation, specific nomenclature is set forth to provide a thorough understanding of the present application. However, it will be apparent to one skilled in the art that these specific details are not required to practice the invention. Descriptions of specific applications are provided only as representative examples. The present application is not intended to be limited to the embodiments shown, but is to be accorded the widest possible scope consistent with the principles and features disclosed herein.

Unless defined otherwise, all technical and scientific terms used herein have the same meanings as commonly understood by one of skill in the art to which the disclosed method and compositions belong. It must be noted that as used herein and in the appended claims, the singular forms "a," "an," and "the" include plural reference unless the context clearly dictates otherwise. Thus, for example, reference to "a peptide" includes "one or more" peptides or a "plurality" of such peptides. With respect to the teachings in the present application, any issued patent or patent application publication described in this application is expressly incorporated by reference herein.

As used herein, the term "calcium-silicate based porous particle" refers to a porous particle having a structure containing pores on the exterior surface and an interior network of pores running through the structure, and a calcium-silicate composition with a calcium:silicate atomic ratio of 0.05 to 2, and having any suitable shape, e.g., a rectangle, a circle, a sphere, a cube, an ellipse, or other regular or irregular shape. Possible shapes for particles can include spheres, rods, shells, and prisms. In various embodiments, the particles can have the range of diameter size and pore size discussed herein. In certain embodiments, the particles can be functionalized as described herein. In some embodiment, the CSPPs may contain small amount of impurities of magnesium compounds, sodium compounds, aluminum compounds, potassium compounds, carbon compounds, chlorine compounds and other impurities.

Figure 1:
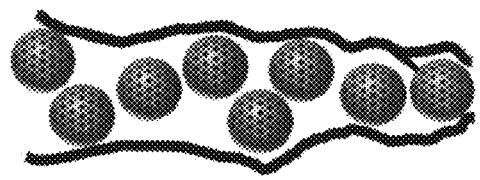
FIG. 1 depicts a possible self-healing or sealing scenario using loaded CSPPs to fill a nanometer-sized crack.
Figure 1:
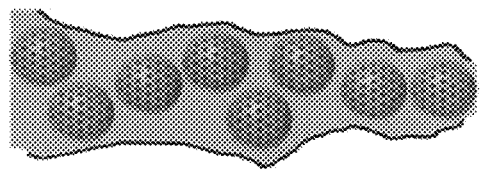

CSPPs may be used in applications involving 1) self-healing 2) sealing 3) synthetic bone, 4) as an additive to make composites, 5) proppants for hydraulic fracturing, 6) particulates to fill the reservoir cracks after hydraulic fracturing, 7) making membranes and/or any separation of gases and/or liquids, and many more. In certain embodiments, methods of use for the particle materials described herein include: 1) ion-exchange applications, 2) carriers of nanosensors, 3) support for size-selective catalysis, 4) insulating materials, 5) dielectric materials, 6) encapsulating agents for pigments, luminescent, optical, electrical and magnetic applications (e.g., MRI contrast agent for the latter), 7) nuclear applications (absorbent for radionucleae for long-term waste containments), 8) heavy ion absorbers, 9) biomedical applications (targeted drug delivery or cancer therapy, bone tissue engineering). Even though one type of CSPPs are cement-based, they are not limited to cement because of the programmable loaded sealant and are not in the same category as self-healing cements which often mainly rely on reactions with penetrating fluids such as hydrocarbons. The CSPPs are not only internally strong due to the inorganic carrier, but upon external stimuli or stress, the sealant will release and bond to a variety of materials including but not limited to cementitious materials, rock, metals, plastics, ceramics, woods, fiber-glass, and other composite materials. An example of a possible scenario which highlights the ability of the product is to heal nanometer-size cracks as shown in FIG. 1.

Method of Synthesis

This process is for the unique creation of porous particles synthesized through wet solution-based synthesizing and composed of calcium and silicon. Depending on the desired size, composition, porosity, and shape, changes may be needed in the synthesis conditions including reaction pH, temperature, time, reactant type and concentration, or solvent(s)/additive type and concentration. One single parameter or a combination of parameters can be varied to lead to different porosity and sizes of particles. These conditions will also depend on the desired sealant which would include variation in loading temperature, possible solvent(s) type and concentration, mixing time, and purification technique. In some embodiments, pores may be 3 nm or 5 nm in average diameter. A variety of conditions and parameters can be optimized to tune the specific properties of CSPPs including but not limited to pore-structure, sealant release rate, durability, compression and tensile strength, toughness, permeability, and heat and chemical resistance.

Figure 2:
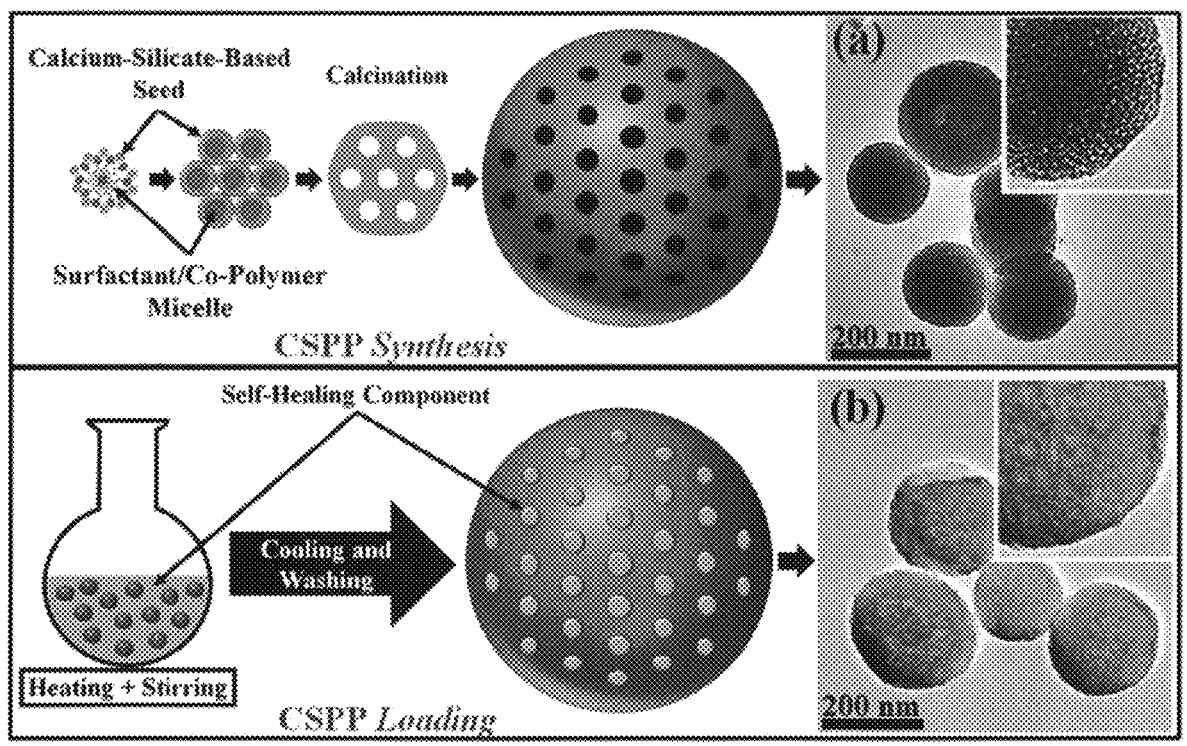
FIG. 2 shows an example of one possible pathway of CSPP synthesis and corresponding TEM images (Panel a) showing the pores (Panel a, inset). (bottom) An example of one possible pathway of CSPP loading and corresponding TEM images (Panel b) showing loaded pores (Panel b, inset).

An illustration of a typical synthesis and loading procedure can be seen in FIG. 2. This embodiment is one of many possible synthesis protocols for creating a variety of CSPPs with tuned parameters (See FIG. 2). In some embodiments, the process involves reactants producing a unique overall system with particular pH (e.g., pH of around 7, or in some embodiments pH of around 4-11), etc, for CSPP synthesis. In some embodiments, refinement via slight changes to the product synthesis, loading, and development can be performed by modification to reaction pH, temperature, time, reactant type and concentration, and solvent(s)/additive(s) type and concentration along with loading temperature, sealant[/solvent(s)] type and concentration, mixing time, and purification technique, etc. This is in order to create a final product with the best balance of multiple properties such as mechanical, self-healing, sealing and durability properties. The synthesis of the CSPPs can involve a range of conditions including but not limited to the following, any of which embodiments may be considered in combination with each other according to the desired requirements for synthesizing final product CSPPs.

In some embodiments, the surfactant type may be cetyltrimethylammonium bromide (CTAB), dodecyltrimethylammonium bromide (DTAB), decyltrimethylammonium bromide, Pluronic® F127, Pluronic® F68, or other possible Poloxamer types, or other similar cation and neutral (non-ionic) surfactants along with similar anion surfactant species, zwitterion surfactants and combinations thereof. Cationic surfactants that may work include: Benzalkonium chloride, cetyltrimethylammonium chloride, Octenidine dihydrochloride. Non-ionic surfactants that may work include: Polysorbate 20 or 80 (Tween 20 or 80) or similar types, Triton X-100, polyethylene glycol hexadecyl ether (Cetomacrogol 1000), Sorbitan tristearate, Pentaethylene glycol monododecyl ether (C12E5), Octaethylene glycol monododecyl ether (C12E8), Decyl glucoside, IGEPAL CA-630, Isoceteth-20, Octyl glucoside, Octaethylene glycol monododecyl ether (C12E8), Nonidet P-40. SDS, an anionic surfactant, or the combination thereof. The choice of surfactant is not limiting on the method.

In some embodiments, the surfactant concentration may be 0.1-100 mM. In certain embodiments, the surfactant concentration may be greater than 0.1 mM, greater than 0.5 mM, greater than 1 mM, greater than 5 mM, greater than 10 mM, greater than 20 mM, greater than 30 mM, greater than 40 mM, greater than 50 mM, greater than 60 mM, greater than 70 mM, greater than 80 mM, greater than 90 mM. In certain embodiments, the surfactant concentration may be less than 0.5 mM, less than 1 mM, less than 5 mM, less than 10 mM, less than 20 mM, less than 30 mM, less than 40 mM, less than 50 mM, less than 60 mM, less than 70 mM, less than 80 mM, less than 90 mM, less than 100 mM. In certain embodiments, the surfactant concentration may be 0.1-0.5 mM, 0.5-1 mM, 1-5 mM, 5-10 mM, 10-15 mM, 15-20 mM, 20-25 mM, 25-30 mM, 30-35 mM, 35-40 mM, 40-45 mM, 45-50 mM, 50-55 mM, 55-60 mM, 60-65 mM, 65-70 mM, 70-75 mM, 75-80 mM, 80-85 mM, 85-90 mM, 90-95 mM, 95-100 mM, or combinations of the foregoing ranges. In some embodiments, the reactant types may be silicon sources, such as tetraethyl orthosilicate (TEOS), tetramethyl orthosilicate (TMOS) or other similar silicate species, trimethylethoxysilane (TMEOS) or other similar silane species, potassium metasilicate, sodium metasilicate, or other similar sodium silicate species, or any other hydrated version of these sources. The silicon source may also be a functionalized silicon source such as (3-aminopropyl)triethoxysilane (APTES); functionalized silicon sources are not limited to amine but may also include thiols and phosphines, hydrocarbons and combinations thereof.

In some embodiments, the ingredients may contain octane, heptane, hexane, nonane, pentane or any other type of similar short organic molecule(s) and their compositional components, and branched hydrocarbons and combinations thereof. In certain embodiments, any hydrophobic organic molecules may be used, e.g., branched or linear hydrocarbons with more than five carbon atoms in their molecule structure (see for example FIG. 3). The method herein is not limited to using hydrocarbons, but also comprises using sealants such as epoxies, polymers, etc. In one embodiment, particles produced were sealant loaded in to the pores of particles.

In some embodiments, the reactant types may be calcium sources, such as calcium nitrate, calcium chloride, calcium oxide, calcium salt, other calcium (+2) ion sources, or any other hydrated version of these sources, and combination thereof. In some embodiments, the reactant types may be a porous silicate including alkali-metal silicates, alkaline earth metal silicates, or aluminum silicates, or compounds including aluminum silicate, magnesium aluminum silicate, sodium silicate, potassium silicate, magnesium silicate, or calcium silicate, the combination thereof, or any other solid matrix described herein. In other embodiments, calcium bicarbonate may be used.

In some embodiments, the reactant concentration may be 0.1-500 mM. In certain embodiments, the reactant concentration may be greater than 0.1 mM, greater than 0.5 mM, greater than 1 mM, greater than 5 mM, greater than 10 mM, greater than 20 mM, greater than 30 mM, greater than 40 mM, greater than 50 mM, greater than 60 mM, greater than 70 mM, greater than 80 mM, greater than 90 mM, greater than 100 mM, greater than 110 mM, greater than 120 mM, greater than 130 mM, greater than 140 mM, greater than 150 mM, greater than 160 mM, greater than 170 mM, greater than 180 mM, greater than 200 mM, greater than 250 mM, greater than 300 mM, greater than 350 mM, greater than 400 mM, greater than 450 mM. In certain embodiments, the reactant concentration may be less than 0.5 mM, less than 1 mM, less than 5 mM, less than 10 mM, less than 20 mM, less than 30 mM, less than 40 mM, less than 50 mM, less than 60 mM, less than 70 mM, less than 80 mM, less than 90 mM, less than 100 mM, less than 110 mM, less than 120 mM, less than 130 mM, less than 140 mM, less than 150 mM, less than 160 mM, less than 170 mM, less than 180 mM, less than 200 mM, less than 250 mM, less than 300 mM, less than 350 mM, less than 400 mM, less than 450 mM, less than 500 mM. In certain embodiments, the reactant concentration may be 0.1-0.5 mM, 0.5-1 mM, 1-5 mM, 5-10 mM, 10-15 mM, 15-20 mM, 20-25 mM, 25-30 mM, 30-35 mM, 35-40 mM, 40-45 mM, 45-50 mM, 50-55 mM, 55-60 mM, 60-65 mM, 65-70 mM, 70-75 mM, 75-80 mM, 80-85 mM, 85-90 mM, 90-95 mM, 95-100 mM, 100-150 mM, 150-200 mM, 200-250 mM, 250-300 mM, 300-350 mM, 350-400 mM, 400-450 mM, 450-500 mM, or combinations of these ranges.

In addition, some embodiments the synthesis catalyst type may be base or acid such as ammonium hydroxide, sodium hydroxide, potassium hydroxide, L-lysine, lysine, hydrazine, methylamine, ethylamine, ethylenediamine, hydrochloric acid, sulfuric acid, acetic acid, amino acids, any bases and acids and combinations thereof. In certain embodiments, an inorganic or organic base or acid can be used as a catalyst. In particular embodiments, bases that can be used are: calcium hydroxide, lithium hydroxide, methylamine, pyridine, rubidium hydroxide, zinc hydroxide, strontium hydroxide, barium hydroxide, magnesium hydroxide, caesium hydroxide, sodium carbonate, sodium bicarbonate, calcium carbonate, calcium diphosphate, barium sulfate. In particular embodiments, acids that can be used are: perchloric acid, hydrochloric acid, hydrobromic acid, hydroiodic acid, nitric acid, sulfuric acid, phosphoric acid, hydrofluoric acid, acetic acid, citric acid, carbonic acid, oxalic acid, nitrous acid, chlorous acid, sulfurous acid, and boric acid.

In certain embodiments, the synthesis catalyst concentration may be 0.001-10 M. In certain embodiments, the synthesis catalyst concentration may be greater than 0.001, greater than 0.005 M, greater than 0.01 M, greater than 0.02 M, greater than 0.03 M, greater than 0.05 M, greater than 0.1 M, greater than 0.2 M, greater than 0.3 M, greater than 0.4 M, greater than 0.5 M, greater than 0.6 M, greater than 0.7 M, greater than 0.8 M, greater than 0.9 M, greater than 1 M, greater than 2 M, greater than 3 M, greater than 4 M, greater than 5 M, greater than 6 M, greater than 7 M, greater than 8 M, greater than 9 M. In certain embodiments, the synthesis catalyst concentration may be less than 0.01 M, less than 0.02 M, less than 0.03 M, less than 0.05 M, less than 0.1 M, less than 0.2 M, less than 0.3 M, less than 0.4 M, less than 0.5 M, less than 0.6 M, less than 0.7 M, less than 0.8 M, less than 0.9 M, less than 1 M, less than 2 M, less than 3 M, less than 4 M, less than 5 M, less than 6 M, less than 7 M, less than 8 M, less than 9 M, less than 10 M. In certain embodiments, the synthesis catalyst concentration may be 0.001-0.05 M, 0.05-0.5 M, 0.5-1 M, 1-1.5 M, 1.5-2 M, 2-2.5 M, 2.5-3 M, 3-3.5 M, 3.5-4 M, 4-4.5 M, 4.5-5 M, 5-5.5 M, 5.5-6 M, 6-6.5 M, 6.5-7 M, 7-7.5 M, 7.5-8 M, 8-8.5 M, 8.5-9 M, 9-9.5 M, 9.5-10 M, or combinations of these ranges.

In some embodiments, the solution medium may be water, tert-butanol, 1- and 2-butanol, 1- and 2-propanol, ethanol, methanol, acetone, and combinations thereof. In certain embodiments, the following solvents may be used: acetic acid, acetonitrile, t-butyl alcohol, diglyme, 1,2-dimethoxyethane, dimethyl-formamide, 1,4-dioxane, ethylene glycol, glycerin, hexamethylphosphoramide, hexamethylphosphorous triamide, pyridine, heavy water, and/or the combination thereof.

In certain embodiments, the reaction temperature may be 1-100° C. In certain embodiments, the reaction temperature may be greater than 1° C., greater than 10° C., greater than 15° C., greater than 25° C., greater than 35° C., greater than 45° C., greater than 55° C., greater than 65° C., greater than 75° C., greater than 85° C., greater than 95° C. In certain embodiments, the reaction temperature may be less than 10° C., less than 15° C., less than 25° C., less than 35° C., less than 45° C., less than 55° C., less than 65° C., less than 75° C., less than 85° C., less than 95° C., less than 100° C. In certain embodiments, the reaction temperature is within the range 1-15° C., 15-25° C., 25-35° C., 35-45° C., 45-55° C., 55-65° C., 65-75° C., 75-85° C., 85-95° C., 95-100° C., or combinations of these ranges. The foregoing ranges are not limiting upon the practice of the method disclosed herein and different temperatures may be used if required.

In some embodiments, the reaction mixing speed may be 1-15000 rpm. In certain embodiments, the reaction mixing speed may be greater than 1 rpm, greater than 100 rpm, greater than 500 rpm, greater than 1000 rpm, greater than 1500 rpm, greater than 2000 rpm, greater than 3000 rpm, greater than 3500 rpm, greater than 4000 rpm, greater than 4500 rpm, greater than 5000 rpm, greater than 5500 rpm, greater than 6000 rpm, greater than 6500 rpm, greater than 7000 rpm, greater than 7500 rpm, greater than 8000 rpm, greater than 8500 rpm, greater than 9000 rpm, greater than 9500 rpm, greater than 10000 rpm, greater than 10500 rpm, greater than 11000 rpm, greater than 11500 rpm, greater than 12000 rpm, greater than 12500 rpm, greater than 13000 rpm, greater than 13500 rpm, greater than 14000 rpm, greater than 14500 rpm. In certain embodiments, the reaction mixing speed may be less than 1 rpm, less than 100 rpm, less than 500 rpm, less than 1000 rpm, less than 1500 rpm, less than 2000 rpm, less than 3000 rpm, less than 3500 rpm, less than 4000 rpm, less than 4500 rpm, less than 5000 rpm, less than 5500 rpm, less than 6000 rpm, less than 6500 rpm, less than 7000 rpm, less than 7500 rpm, less than 8000 rpm, less than 8500 rpm, less than 9000 rpm, less than 9500 rpm, less than 10000 rpm, less than 10500 rpm, less than 11000 rpm, less than 11500 rpm, less than 12000 rpm, less than 12500 rpm, less than 13000 rpm, less than 13500 rpm, less than 14000 rpm, less than 14500 rpm, less than 15000 rpm. In certain embodiments, the reaction mixing speed may be 1-100 rpm, 100-500 rpm, 500-1000 rpm, 1000-1500 rpm, 1500-2000 rpm, 2000-2500 rpm, 2500-3000 rpm, 3000-3500 rpm, 3500-4000 rpm, 4000-4500 rpm, 4500-5000 rpm, 5000-5500 rpm, 5500-6000 rpm, 6000-6500 rpm, 6500-7000 rpm, 7000-7500 rpm, 7500-8000 rpm, 8000-8500 rpm, 8500-9000 rpm, 9000-9500 rpm, 9500-10000 rpm, 10000-10500 rpm, 10500-11000 rpm, 11000-11500 rpm, 11500-12000 rpm, 12000-12500 rpm, 12500-13000 rpm, 13000-13500 rpm, 13500-14000 rpm, 14000-14500 rpm, 14500-15000 rpm, or combinations of these ranges. The foregoing ranges are not limiting upon the practice of the method disclosed herein and different ranges of speed may be used if required.

In certain embodiments, the reaction duration may be 1-14400 minutes. In certain embodiments, the reaction duration may be greater than 1 minutes, greater than 100 minutes, greater than 500 minutes, greater than 1000 minutes, greater than 1500 minutes, greater than 2000 minutes, greater than 3000 minutes, greater than 3500 minutes, greater than 4000 minutes, greater than 4500 minutes, greater than 5000 minutes, greater than 5500 minutes, greater than 6000 minutes, greater than 6500 minutes, greater than 7000 minutes, greater than 7500 minutes, greater than 8000 minutes, greater than 8500 minutes, greater than 9000 minutes, greater than 9500 minutes, greater than 10000 minutes, greater than 10500 minutes, greater than 11000 minutes, greater than 11500 minutes, greater than 12000 minutes, greater than 12500 minutes, greater than 13000 minutes, greater than 13500 minutes, greater than 14000 minutes. In certain embodiments, the reaction duration may be less than 1 minutes, less than 100 minutes, less than 500 minutes, less than 1000 minutes, less than 1500 minutes, less than 2000 minutes, less than 3000 minutes, less than 3500 minutes, less than 4000 minutes, less than 4500 minutes, less than 5000 minutes, less than 5500 minutes, less than 6000 minutes, less than 6500 minutes, less than 7000 minutes, less than 7500 minutes, less than 8000 minutes, less than 8500 minutes, less than 9000 minutes, less than 9500 minutes, less than 10000 minutes, less than 10500 minutes, less than 11000 minutes, less than 11500 minutes, less than 12000 minutes, less than 12500 minutes, less than 13000 minutes, less than 13500 minutes, less than 14000 minutes, less than 14400 minutes. In certain embodiments, the reaction duration may be 1-100 minutes, 100-200 minutes, 200-300 minutes, 300-400 minutes, 400-500 minutes, 500-600 minutes, 600-700 minutes, 700-800 minutes, 800-900 minutes, 900-1000 minutes, 1000-1500 minutes, 1500-2000 minutes, 2000-2500 minutes, 2500-3000 minutes, 3500-4000 minutes, 4000-4500 minutes, 4500-5000 minutes, 5000-6000 minutes, 6000-7000 minutes, 7000-8000 minutes, 8000-9000 minutes, 9000-10000 minutes, 10000-11000 minutes, 11000-12000 minutes, 12000-13000 minutes, 13000-14400 minutes, or combinations of these ranges. The foregoing ranges are not limiting upon the practice of the method disclosed herein and longer periods of time may be used if required.

In some embodiments, the particle collection/washing mechanism may be centrifugation and/or filtering including but not limited to vacuum filtration, osmotic filtering and/or the combination thereof.

In certain embodiments, residual contaminate removal may be performed by acid wash and/or calcination, centrifugation, washing, filtering, washing and osmotic filtering and/or the combination thereof.

In some embodiments, the calcination temperature is 100-1000° C. In certain embodiments, the calcination temperature may be greater than 100° C., greater than 200° C., greater than 300° C., greater than 400° C., greater than 500° C., greater than 600° C., greater than 700° C., greater than 800° C., greater than 900° C. In certain embodiments, the calcination temperature may be less than 200° C., less than 300° C., less than 400° C., less than 500° C., less than 600° C., less than 700° C., less than 800° C., less than 900° C., less than 1000° C. In certain embodiments, the calcination temperature is within the range 100-150° C., 150-250° C., 250-350° C., 350-450° C., 450-550° C., 550-650° C., 650-750° C., 750-850° C., 850-950° C., 950-1000° C., or combinations of these ranges. The foregoing ranges are not limiting upon the practice of the method disclosed herein and different temperatures may be used if required.

In certain embodiments, the calcination time may be 1-14400 minutes. In certain embodiments, the calcination time may be greater than 1 minutes, greater than 100 minutes, greater than 500 minutes, greater than 1000 minutes, greater than 1500 minutes, greater than 2000 minutes, greater than 3000 minutes, greater than 3500 minutes, greater than 4000 minutes, greater than 4500 minutes, greater than 5000 minutes, greater than 5500 minutes, greater than 6000 minutes, greater than 6500 minutes, greater than 7000 minutes, greater than 7500 minutes, greater than 8000 minutes, greater than 8500 minutes, greater than 9000 minutes, greater than 9500 minutes, greater than 10000 minutes, greater than 10500 minutes, greater than 11000 minutes, greater than 11500 minutes, greater than 12000 minutes, greater than 12500 minutes, greater than 13000 minutes, greater than 13500 minutes, greater than 14000 minutes. In certain embodiments, the calcination time may be less than 1 minutes, less than 100 minutes, less than 500 minutes, less than 1000 minutes, less than 1500 minutes, less than 2000 minutes, less than 3000 minutes, less than 3500 minutes, less than 4000 minutes, less than 4500 minutes, less than 5000 minutes, less than 5500 minutes, less than 6000 minutes, less than 6500 minutes, less than 7000 minutes, less than 7500 minutes, less than 8000 minutes, less than 8500 minutes, less than 9000 minutes, less than 9500 minutes, less than 10000 minutes, less than 10500 minutes, less than 11000 minutes, less than 11500 minutes, less than 12000 minutes, less than 12500 minutes, less than 13000 minutes, less than 13500 minutes, less than 14000 minutes, less than 14400 minutes. In certain embodiments, the calcination time may be 1-100 minutes, 100-200 minutes, 200-300 minutes, 300-400 minutes, 400-500 minutes, 500-600 minutes, 600-700 minutes, 700-800 minutes, 800-900 minutes, 900-1000 minutes, 1000-1500 minutes, 1500-

2000 minutes, 2000-2500 minutes, 2500-3000 minutes, 3500-4000 minutes, 4000-4500 minutes, 4500-5000 minutes, 5000-6000 minutes, 6000-7000 minutes, 7000-8000 minutes, 8000-9000 minutes, 9000-10000 minutes, 10000-11000 minutes, 11000-12000 minutes, 12000-13000 minutes, 13000-14400 minutes, or combinations of these ranges. The foregoing ranges are not limiting upon the practice of the method disclosed herein and longer periods of time may be used if required.

In some embodiments, the CSPPs synthesized by the process may have a particle size of 1-1,000 nanometers average diameter and pore size of 1-50 nanometers average diameter. In certain embodiments, the particle size average diameter may be greater than 1 nanometers, greater than 10 nanometers, greater than 15 nanometers, greater than 25 nanometers, greater than 35 nanometers, greater than 45 nanometers, greater than 55 nanometers, greater than 65 nanometers, greater than 75 nanometers, greater than 85 nanometers, greater than 95 nanometers, greater than 100 nanometers, greater than 200 nanometers, greater than 300 nanometers, greater than 400 nanometers, greater than 500 nanometers, greater than 600 nanometers, greater than 700 nanometers, greater than 800 nanometers, greater than 900 nanometers. In certain embodiments, the particle size average diameter may be less than 10 nanometers, less than 15 nanometers, less than 25 nanometers, less than 35 nanometers, less than 45 nanometers, less than 55 nanometers, less than 65 nanometers, less than 75 nanometers, less than 85 nanometers, less than 95 nanometers, less than 100 nanometers, less than 200 nanometers, less than 300 nanometers, less than 400 nanometers, less than 500 nanometers, less than 600 nanometers, less than 700 nanometers, less than 800 nanometers, less than 900 nanometers, less than 1000 nanometers. In certain embodiments, the particle size average diameter may be 1-5 nanometers. 5-10 nanometers, 10-15 nanometers, 15-20 nanometers, 20-30 nanometers, 30-40 nanometers, 40-50 nanometers, 50-60 nanometers, 60-70 nanometers, 70-80 nanometers, 90-100 nanometers, 100-200 nanometers, 200-300 nanometers, 300-400 nanometers, 400-500 nanometers, 600-700 nanometers, 700-800 nanometers, 800-900 nanometers, 900-1000 nanometers, or combinations of these ranges. In certain embodiments, the pore size average diameter may be greater than 1 nanometers, greater than 10 nanometers, greater than 15 nanometers, greater than 25 nanometers, greater than 35 nanometers, greater than 45 nanometers. In certain embodiments, the pore size average diameter may be less than 5 nanometers, less than 10 nanometers, less than 15 nanometers, less than 25 nanometers, less than 35 nanometers, less than 45 nanometers, less than 50 nanometers. In certain embodiments, the pore size average diameter may be 1-2 nanometers, 2-4 nanometers, 4-6 nanometers, 6-8 nanometers, 8-10 nanometers, 10-15 nanometers, 15-20 nanometers, 20-25 nanometers, 25-30 nanometers, 30-35 nanometers, 35-40 nanometers, 40-45 nanometers, 45-50 nanometers, or combinations of these ranges.

Method of Loading Synthesized CSPPs

The loading procedure is crucial in obtaining particles with sufficient sealant to enable the desired functionality such as sealing and/or a self-healing. The loading embodiments herein are illustrative and not restrictive. Other embodiments include but are not limited to vacuum infiltration loading. The loading embodiments herein provide a two-part system (some CSPPs loaded with epoxy, some CSPPs loaded with hardener or reactant), a three-part system (some CSPPs loaded with epoxy, some CSPPs loaded with hardener or reactant and some CSPPs loaded with a catalyst); these are usually then added together and mixed by mechanical mixing. In some embodiments, the mole ratio may be around epoxy:hardener=1:1 and epoxy:catalyst=1:0.3, but systems with different amounts of epoxies, hardeners, and/or catalyst loaded particles may be used. The loading procedure is not restricted to two-part systems or three-part systems, for example, it can be a one-part system where only one sealant (or hardener) is loaded and will react with environmental conditions: heat, moisture, pH, etc. The loading of the CSPPs can involve a range of conditions including but not limited to the following.

In some embodiments, the loading mechanism may involve direct impregnation, solvent-assisted impregnation, vacuum infiltration/impregnation, and/or combination thereof, and any similar methods.

In certain embodiments, the loaded sealant material may be from the family of epoxy molecules, polymer, initiator, hardener, reactant, catalyst, and any combinations thereof. Here the family of epoxy molecules covers derivatives, isomers, substituted epoxy, and/or the combination thereof. Also the epoxy is not limited to one epoxy group per molecule and it covers any number of epoxy groups in the molecule.

In some embodiments, the mixing speed is 1-15000 rpm. In certain embodiments, the reaction mixing speed may be greater than 1 rpm, greater than 100 rpm, greater than 500 rpm, greater than 1000 rpm, greater than 1500 rpm, greater than 2000 rpm, greater than 3000 rpm, greater than 3500 rpm, greater than 4000 rpm, greater than 4500 rpm, greater than 5000 rpm, greater than 5500 rpm, greater than 6000 rpm, greater than 6500 rpm, greater than 7000 rpm, greater than 7500 rpm, greater than 8000 rpm, greater than 8500 rpm, greater than 9000 rpm, greater than 9500 rpm, greater than 10000 rpm, greater than 10500 rpm, greater than 11000 rpm, greater than 11500 rpm, greater than 12000 rpm, greater than 12500 rpm, greater than 13000 rpm, greater than 13500 rpm, greater than 14000 rpm, greater than 14500 rpm. In certain embodiments, the reaction mixing speed may be less than 1 rpm, less than 100 rpm, less than 500 rpm, less than 1000 rpm, less than 1500 rpm, less than 2000 rpm, less than 3000 rpm, less than 3500 rpm, less than 4000 rpm, less than 4500 rpm, less than 5000 rpm, less than 5500 rpm, less than 6000 rpm, less than 6500 rpm, less than 7000 rpm, less than 7500 rpm, less than 8000 rpm, less than 8500 rpm, less than 9000 rpm, less than 9500 rpm, less than 10000 rpm, less than 10500 rpm, less than 11000 rpm, less than 11500 rpm, less than 12000 rpm, less than 12500 rpm, less than 13000 rpm, less than 13500 rpm, less than 14000 rpm, less than 14500 rpm, less than 15000 rpm. In certain embodiments, the reaction mixing speed may be 1-100 rpm, 100-500 rpm, 500-1000 rpm, 1000-1500 rpm, 1500-2000 rpm, 2000-2500 rpm, 2500-3000 rpm, 3000-3500 rpm, 3500-4000 rpm, 4000-4500 rpm, 4500-5000 rpm, 5000-5500 rpm, 5500-6000 rpm, 6000-6500 rpm, 6500-7000 rpm, 7000-7500 rpm, 7500-8000 rpm, 8000-8500 rpm, 8500-9000 rpm, 9000-9500 rpm, 9500-10000 rpm, 10000-10500 rpm, 10500-11000 rpm, 11000-11500 rpm, 11500-12000 rpm, 12000-12500 rpm, 12500-13000 rpm, 13000-13500 rpm, 13500-14000 rpm, 14000-14500 rpm, 14500-15000 rpm, or combinations of the foregoing ranges. The foregoing ranges are not limiting upon the practice of the method disclosed herein and different speed ranges may be used if required.

In certain embodiments, the mixing temperature is 1-400° C. In certain embodiments, the mixing temperature may be greater than 1° C., greater than 10° C., greater than 15° C., greater than 25° C., greater than 35° C., greater than 45° C., greater than 55° C., greater than 65° C., greater than 75° C., greater than 85° C., greater than 95° C., greater than 100° C., greater than 200° C., greater than 300° C. In certain embodiments, the mixing temperature may be less than 10° C., less than 15° C., less than 25° C., less than 35° C., less than 45° C., less than 55° C., less than 65° C., less than 75° C., less than 85° C., less than 95° C., less than 100° C., less than 200° C., less than 300° C., less than 400° C. In certain embodiments, the mixing temperature is within the range 1-15° C., 15-25° C., 25-35° C., 35-45° C., 45-55° C., 55-65° C., 65-75° C., 75-85° C., 85-95° C., 95-100° C., 100-150° C., 150-200° C., 200-250° C., 250-300° C., 300-350° C., 350-400° C. or combinations of the foregoing ranges. The foregoing ranges are not limiting upon the practice of the method disclosed herein and different temperatures may be used if required.

The mixing duration is 1-14400 minutes. In certain embodiments, the mixing duration may be greater than 1 minute, greater than 100 minutes, greater than 500 minutes, greater than 1000 minutes, greater than 1500 minutes, greater than 2000 minutes, greater than 3000 minutes, greater than 3500 minutes, greater than 4000 minutes, greater than 4500 minutes, greater than 5000 minutes, greater than 5500 minutes, greater than 6000 minutes, greater than 6500 minutes, greater than 7000 minutes, greater than 7500 minutes, greater than 8000 minutes, greater than 8500 minutes, greater than 9000 minutes, greater than 9500 minutes, greater than 10000 minutes, greater than 10500 minutes, greater than 11000 minutes, greater than 11500 minutes, greater than 12000 minutes, greater than 12500 minutes, greater than 13000 minutes, greater than 13500 minutes, greater than 14000 minutes. In certain embodiments, the mixing duration may be less than 1 minutes, less than 100 minutes, less than 500 minutes, less than 1000 minutes, less than 1500 minutes, less than 2000 minutes, less than 3000 minutes, less than 3500 minutes, less than 4000 minutes, less than 4500 minutes, less than 5000 minutes, less than 5500 minutes, less than 6000 minutes, less than 6500 minutes, less than 7000 minutes, less than 7500 minutes, less than 8000 minutes, less than 8500 minutes, less than 9000 minutes, less than 9500 minutes, less than 10000 minutes, less than 10500 minutes, less than 11000 minutes, less than 11500 minutes, less than 12000 minutes, less than 12500 minutes, less than 13000 minutes, less than 13500 minutes, less than 14000 minutes, less than 14400 minutes. In certain embodiments, the mixing duration may be 1-100 minutes, 100-200 minutes, 200-300 minutes, 300-400 minutes, 400-500 minutes, 500-600 minutes, 600-700 minutes, 700-800 minutes, 800-900 minutes, 900-1000 minutes, 1000-1500 minutes, 1500-2000 minutes, 2000-2500 minutes, 2500-3000 minutes, 3500-4000 minutes, 4000-4500 minutes, 4500-5000 minutes, 5000-6000 minutes, 6000-7000 minutes, 7000-8000 minutes, 8000-9000 minutes, 9000-10000 minutes, 10000-11000 minutes, 11000-12000 minutes, 12000-13000 minutes, 13000-14400 minutes, or combinations of these ranges. The foregoing ranges are not limiting upon the practice of the method disclosed herein and longer periods of time may be used if required.

The cooling temperature is 1-400° C. In certain embodiments, the cooling temperature may be greater than 1° C., greater than 10° C., greater than 15° C., greater than 25° C., greater than 35° C., greater than 45° C., greater than 55° C., greater than 65° C., greater than 75° C., greater than 85° C., greater than 95° C., greater than 100° C., greater than 200° C., greater than 300° C. In certain embodiments, the cooling temperature may be less than 10° C., less than 15° C., less than 25° C., less than 35° C., less than 45° C., less than 55° C., less than 65° C., less than 75° C., less than 85° C., less than 95° C., less than 100° C., less than 200° C., less than 300° C., less than 400° C. In certain embodiments, the cooling temperature is within the range 1-15° C., 15-25° C., 25-35° C., 35-45° C., 45-55° C., 55-65° C., 65-75° C., 75-85° C., 85-95° C., 95-100° C., 100-150° C., 150-200° C., 200-250° C., 250-300° C., 300-350° C., 350-400° C., or combinations of the foregoing ranges. The foregoing ranges are not limiting upon the practice of the method disclosed herein and different temperatures may be used if required.

In certain embodiments, the particle washing/collection mechanism is centrifugation and/or filtering including but not limited to vacuum filtration, and, in certain embodiments, may also involve a gravity settling process for collection.

Formulations

In one embodiment, the sealing and/or self-healing composite material is formed into a bulk material or added into a matrix to make a bulk material; this final product may be used to exhibit multiple properties such as sealing, self-healing, mechanical and durability properties and the combination thereof. In certain embodiments, one part epoxy loaded and one part hardener loaded particles and/or catalyst-loaded particles are mixed as a powder-type material. They are then added to a solvent such as water and stirred. This is then applied to a specific material with a crack or damaged site. Alternatively, this combined powder-type material may be used as an additive in construction, concrete, or other similar matrices and poured as is typically standard.

The loaded particles can be mixed with Portland cement (type I, II, III, IV and V and white cement), well cement (class A, B, C, G and H), calcium-aluminate cement, or the combination thereof, or any other cementitious material (e.g. microfine cement or similar alternative cements) as an additive (e.g., 0.01-99% weight ratio, in certain instances 0.05-20% weight ratio) to make a composite material. In some embodiment, this composite can be used and pumped down into a well to perform as a self-healing cement (so-called primary cementing). In some embodiment, this composite can be used as a component of a physical structure that exhibits self-healing and/or sealing properties. In some embodiment, this composite can be used to repair a physical structure (for example, sealing the cracks or gaps) and/or to repair a well. Alternatively, the loaded particles are mixed with water or some other solvents as a carrier and directly injected into the cracked areas downhole (so-called remedial and/or squeeze cementing). In some embodiments, the loaded particles are mixed with water or some other solvents as a carrier and directly used in the cracked or gaps of a physical structure.

Methods of Use

CSPPs will find utilization in numerous applications. For sealing and/or self-healing embodiments, the loaded particles can be unloaded in a variety of real-world applications including but not limited to activation (unloading) via stimuli such as pH effects, magnetic field-induced effects, electric field-induced effect, crack-induced effect, temperature-induced effects, moisture-induced effect, hydrocarbon-induced effect, $CO_2$-induced effect, and/or the combination thereof. The unloading of the CSPPs can involve a range of conditions including but not limited to the following: change in particle or environment pH, pressure, temperature, moisture, magnetic field, electric field, changes in the concentration of hydrocarbons and/or $CO_2$, changes in the continuity of the material (cracking), and/or the combination thereof.

Methods of use include, but are not limited to, the following applications: stationary phases for liquid chromatography, supports for immobilizing biomolecules; catalysts, agent for polymer reinforcement and hard templates for the preparation of mesoporous carbons; porous particles-assisted bioimaging applications; porous particles as bioactive materials for tissue regeneration; use as catalyst-immobilization matrices; solid supported catalysts for inorganic, organic end enzymatic catalysis fields (this includes use of porous particles for multiple catalyst immobilizations (or other multi functionalization); applying porous particles to treat contamination streams by transition metals, heavy metals, and radioactive compounds of water; use in liquid phase organic reactions of porous particles as heterogeneous catalysts; using particles as activated charcoal and zeolites; the development of cancer therapies using porous particles; controlled release of bioactive molecules using porous particles in various food technologies (e.g., catalysts in the synthesis of essential nutrients, or sensors to detect unhealthy products, or combining porous particles materials with food to protect bioactive molecules during their passage though the digestive system); functionalized porous particles used in capillary electrophoresis for enantiomer separations as an additive to the background electrolyte solution to enhance chiral selectivity.

Other methods of use may include producing membranes by using porous particles for making organic-inorganic hybrid materials; carbon dioxide capture for making composite materials from simulated flue gas or ambient air using porous particles; light harvesting using porous particles in optical applications, or use in sensing and imprinting (e.g., the incorporation of dye molecules in the interior network of pores); using porous particles in gas separation processes, such as hydrogen/nitrogen separation in ammonia plants, or hydrogen/hydrocarbon separation in petrochemical operations, or toxic and irritable gas separation in environmental and industrial discharge, or air separation for oxycombustion applications and CO2 and water removal from natural gas; application of porous particles in electronic devices and low-k PMO films (e.g., the integration of electro active organic moieties including electro active dye molecules into the pore walls of porous particles with porous structural order. Such materials are generally produced by incorporating or densely packing active molecules (for example, fullerene C60, viologen and dye molecules), with a bridged organosilane precursor that is fixed into the pore walls). Methods of use further include, but are not limited to, the following: protein or amino acid filled particles for stimulating biological activity; biological detoxifier or antioxidant; biological catalyst for hydroxyapatite or bone-based growth; a reaction seed or catalyst; self-healing or sensing material; viscosifier or gelling agent; contamination filter or toxin decomposer; hydration catalyst/seed for cementitious materials; contrast agents; drug-delivery for proteins that are hydrophilic; as reaction sites for calcium carbonate formation in applications similar to concrete/cement self-healing; additives for cementing applications; membranes; gene silencing.

Methods of use may also include, but are not limited to, the following: ion-exchange applications; carriers of nanosensors; support for size-selective catalysis; insulating materials; dielectric materials; encapsulating agents for pigments, luminescent, optical, electrical and magnetic applications (e.g. MRI contrast agent for the latter); nuclear applications (absorbent for radionucleae for long-term waste containments); heavy ion absorbers; biomedical applications (targeted drug delivery or cancer therapy, bone tissue engineering); proppants, particulates to fill the reservoir cracks induced by hydraulic fracturing.

Additional applications of the composite material (loaded and/or unloaded CSPPs combined with a matrix) include: mixing loaded and/or unloaded CSPPs with Special Systems such as thixotropic cements (clay-based cements, calcium-sulfate-based systems, aluminum sulfate/iron (II) sulfate systems, cross-linked cellulose polymer systems and the combination thereof), expansive cement systems (ettringite systems, salt cements, aluminum powder, calcined magnesium oxide and the combination thereof), freeze-protected cements, salt cement systems (salty water as mixing fluid, salt as a cement additive, cementing across shale and bentonitic clay formations, cementing across massive salt formations, and the combination thereof), latex-modified cement systems (early latex-modified well cement systems, styrene butadiene latex systems and the combination thereof), cement for corrosive environments (cement for chemical waste disposal wells, cement for enhanced oil and gas recovery by CO2 flooding, and the combination thereof), blast-furnace-slag systems (portland slag cements, slag cements and the combination thereof), salt-zone cementing, CO2 resistant cements, foamed cement, low density cement, ultra low density cement, high density cement, fly-ash (class F and C and the combination thereof) systems, flexible cement, microfine cements, acid-soluble cements, epoxy-based polymer cements, engineered particle size distribution cements and systems, compressible cement, low-permeability cement, right-angle-set cements, expanding cements, chemically bonded phosphate ceramics, storable cement slurries, cementitious drilling fluids, foaming agents, stablizers, elastomeric composites, thermal cements (class J cements), calcium aluminosilicate systems, calcium phosphate systems, plug cement, squeeze cement (including use of different techniques of low pressure squeeze, high pressure squeeze, running squeeze, hesitation squeeze, braodenhead squeeze), well packers, well spacers, portland cement-based geothermal well cement, wellcement composites, geothermal wellcement composites, muds, drilling fluids, well cement additives such as retarders (lignosulphates, hydroxycarboxlic acids, saccharide compounds, cellulose derivatives, organophosphates, inorganic compounds, and the combination thereof) and extenders (clays, sodium silicates) and pozzolans (diatomaceous earth, flyash, commercial lightweight cement, silica, and the combination thereof) and lightweight particles (expandable perlite, gilsonite, powered coal, microspheres, nitrogen) and weighing agents (ilmenite, hematite, manganese tetraoxide, and the combination thereof), dispersants, and water soluble polymers, and natural polymers (cellulose derivatives, galactomannans, and the combination thereof) and synthetic polymers (non-ionic synthetic polymers, anionic synthetic polymers, cationic synthetic polymers, and the combination thereof) and lost-circulation prevention agents (bridging materials, thixotropic cements, and the combination thereof) and other well cement additives (antifoam agents, strengthening agents, radioactive tracing agents, mud decontaminants, and the combination thereof), hardeners, fluid loss additives, bentonite, construction cement additives, and any combination of the above cements and systems and agents.

Further applications of the composite material (loaded and/or unloaded CSPPs combined with a matrix) include: creating optical transparent composite materials with polymers for the application in optical fibers, light guiding films and LED covers; creating porous particles to create low-dialectical composite materials with polymers; creating porous particles to create composite materials with polymers to improve implant-bone integration and accelerate bone fracture healing; and creating composite materials with polymers to improve implant-bone integration and accelerate bone fracture healing.

The following Examples have been included to illustrate modes of the presently disclosed subject matter. In light of the present disclosure and the general level of skill in the art, those of skill will appreciate that the following Examples are intended to be exemplary only and that numerous changes, modifications, and alterations can be employed without departing from the scope of the presently disclosed subject matter. As would be apparent to one of ordinary skill, all of the parameters that govern particle formation may be varied. These parameters include, but are not limited to, temperature, pH, types and concentration of ingredients, compounds, rate of mixing, presence of and concentration of solvent, additives, etc.

EXAMPLES

Example 1. Synthesis of CSPPs (I)

In some embodiments, the synthesis procedures involve the following: in-house synthesized or commercially bought Bisphenol A diglycidyl ether (BADGE), N,N-Dimethylbenzylamine (DMBA), cetyltrimethylammonium bromide (CTAB), tetraethyl orthosilicate (TEOS), calcium nitrate tetrahydrate, ammonium hydroxide, L-lysine, and octane are supplied. CSPPs are synthesized as follows: 26.64 ml ammonium hydroxide and 0.68 g CTAB are dissolved in 1000 ml water. The resultant solution is stirred at 1000 rpm at 50° C. for one hour. After the solution is cooled down to room temperature, 5.66 g calcium nitrate tetrahydrate and 3.35 ml TEOS are added. The mixture is then stirred at 1000 rpm for 3 hours at room temperature. The synthesized product centrifuged or vacuum-filtered using filter paper with pore size of 2.5 um (Whatman Ashless, Grade 42 Filtration Paper). The obtained mixture is washed with deionized water several times and calcined at 600° C. for 6 hours.

Example 2. Synthesis of CSPPs (II)

Figure 3:
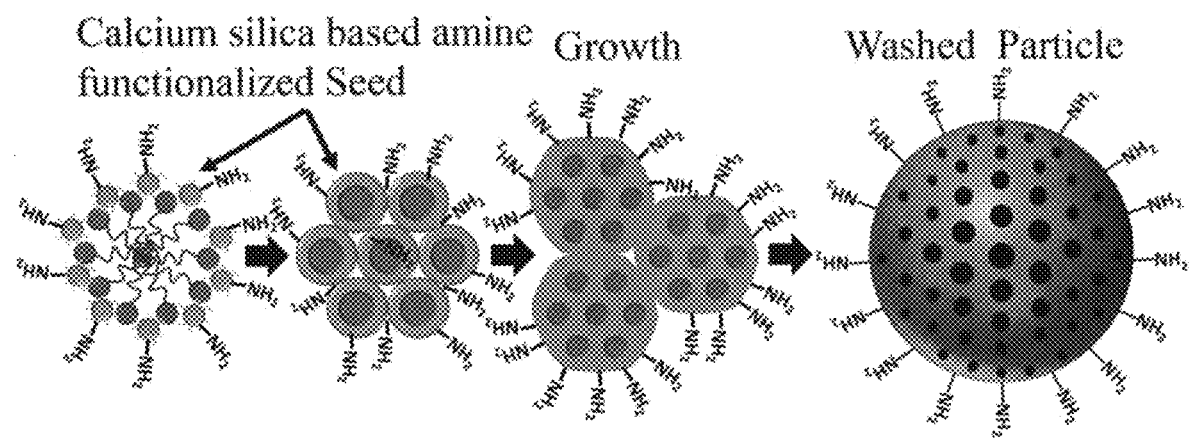
FIG. 3 shows a schematic of synthesis of amine functionalized calcium-silicate based porous particles.

In another embodiment, amine-functionalized calcium-silicate based porous particles are created by utilizing 3-aminopropyl)triethoxysilane (APTES) as the silicon source (see FIG. 3). The functionality of porous particles is not only limited to amine but also covers thiols and phosphines and their combination. The amount of the functional groups on the particles is varied by changing the mole ratio of the functional silicon source and the nonfunctional silicon source such as TEOS in the synthesis. Functionalized particles created in this way eliminate the use of hardener for epoxy sealant. In this case, functionalized porous particles can act as both the sealant (epoxy) carrier and hardener. These are novel amine-functionalized calcium-silicate-based porous particles.

Example 3. Loading of CSPPs with Sealant (I)

In one embodiment, BADGE and DMBA were used as the dual-system sealant materials. By using direct impregnation, the particles were directly soaked in BADGE at 90° C. for 11 hours with constant stirring at 1000 rpm. The CSPPs were retrieved from the BADGE by allowing the mixture to cool and then washing with isopropanol by sonicating for 5 minutes and then performing centrifugation. The washing process was repeated three times. This loading procedure is illustrated in the bottom of FIG. 2. FIG. 2b shows a transmission electron microscopy (TEM) image clearly demonstrating that the internal pores have been loaded with sealant when compared to the unloaded CSPPs in FIG. 2a.

Direct impregnation was also adopted for the loading of DMBA, but unlike the direct impregnation for BADGE, room temperature was used.

Example 4. Loading of CSPPs with Sealant (II)

In one loading embodiment, a solvent-assist method was employed where the particles were soaked in an acetone solution of BADGE. The concentration of the solution was 100 mg (CSPPs)/ml and a mole ratio of CSPP:BADGE=1:1. The CSPPs were first sonicated in an acetone-solution of BADGE for 5 minutes. The resultant mixture was then subjected to gentle vortexing at 400 rpm for 12 hours and dried at 50° C. for 12 hours. Then, it was washing using the process adopted in our direct impregnation method, and the loaded particles were dried again at 50° C. for around 12 hours.

Example 5. Characterization and Testing

The CSPPs and composite material has been characterized under scanning electron microscopy (SEM) (FIG. 4, FIG. 5), energy-dispersive spectroscopy (EDS) (FIG. 4, FIG. 5), transmission electron microscopy (TEM) FIG. 2), X-ray Diffraction (XRD), Brunauer-Emmett-Teller (BET) nitrogen adsorption (FIG. 4), helium pycnometry, thermogravimetric analysis (TGA), and others to provide insight into the CSPPs, composite structure, morphology, porosity, and loading/unloading efficiency. These characterization tools allow us to maximize the beneficial features of our composite hybrid material. Not only were we able to confirm the controlled size, composition, porosity, and shape but the successful loading and release of the sealant upon exposure to external stimuli.

Figure 4:
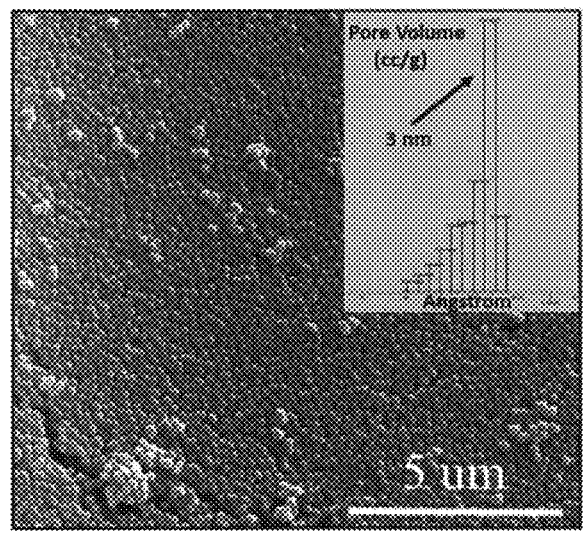
FIG. 4 shows analysis of one embodiment of spherical CSPPs. SEM image of CSPPs where the nitrogen BET analysis (inset) shows the majority of pores are 3 nm.

In some embodiments, characterization and analysis of lab-scale specimens (as seen in FIG. 4) has been performed. FIG. 4 shows an SEM image of an assembled film of CSPPs with 3 nm pores along with the extracted controlled pore size distribution from nitrogen BET analysis (inset).

Figure 5:
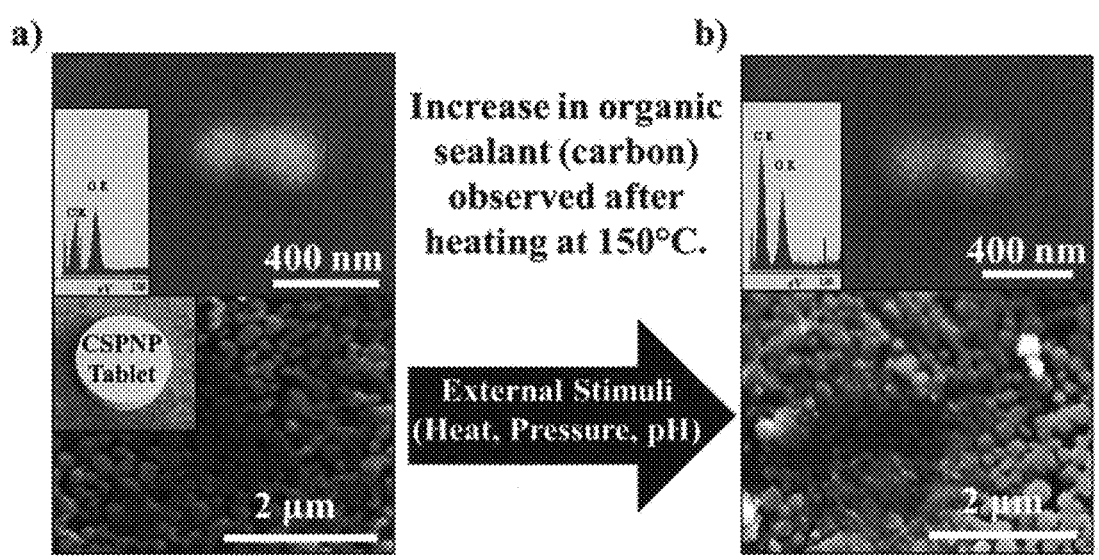
FIG. 5 shows unloading of the CSPPs upon exposure to an external stimuli which in this embodiment is heat (sample heated to 150° C.). (Panel a) Two individual CSPPs (top) [along with their EDS graph (inset)] and the surface of a compacted tablet of CSPPs (bottom) before heating. (Panel b) After heating, the samples have released their loaded sealant to help fill, seal, and/or strengthen the surrounding area.

In some embodiments, the synthesized samples have been exposed to an external stimulus such as heat (as seen in FIG. 5). FIG. 5(a) shows an SEM image of two individual CSPPs (top) [along with their EDS graph (inset)] and the surface of a compacted tablet of CSPPs (bottom) before heating. After heating (FIG. 5(b)), the samples have released their loaded sealant and interacted with their surroundings to form a coherent and/or sealing material.

Figure 6:
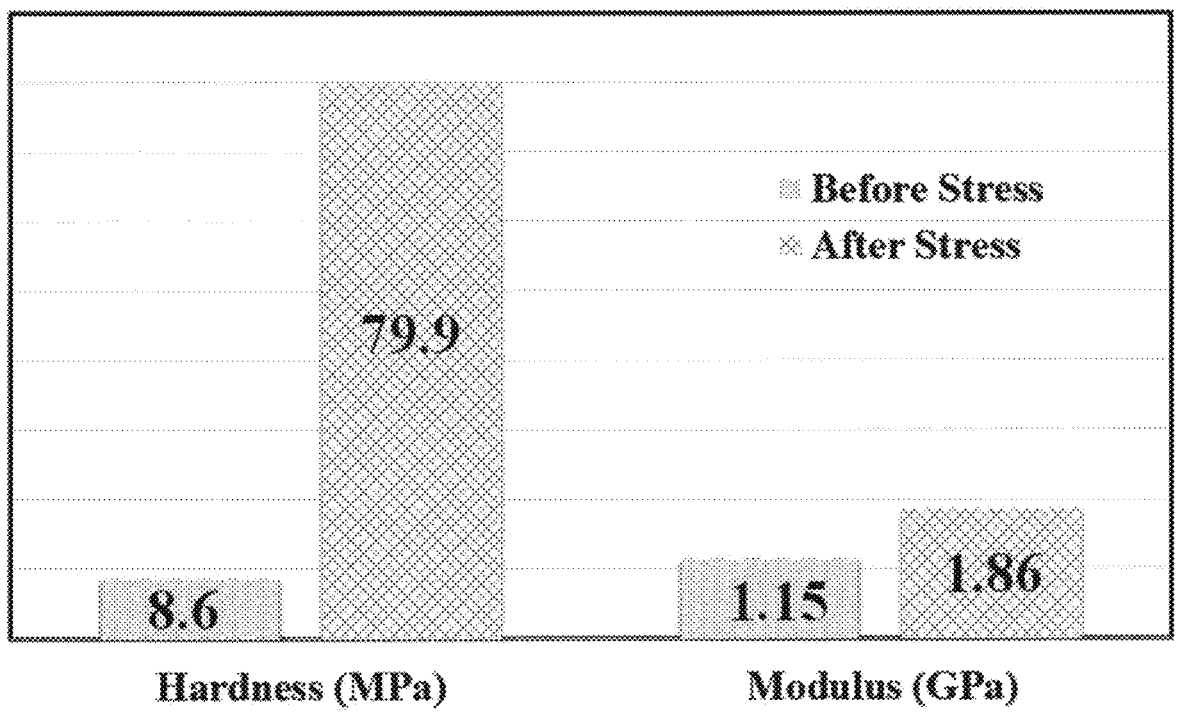
FIG. 6 shows nanoindentation of a sealant-loaded-CSPP film showing the improved mechanical properties after exposing to an external stimulus (in this case heat).
Figure 7:
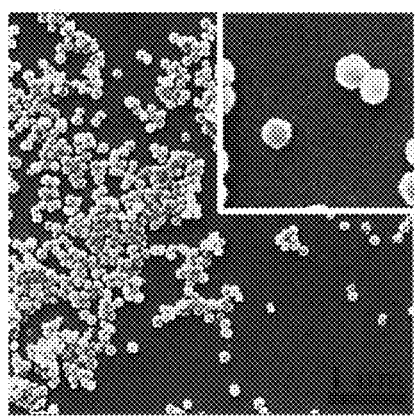
FIG. 7 shows typical uniformity of particle size (Panel a) SEM micrograph of one possible embodiment of the as-synthesized, unloaded CSPPs demonstrating monodisperse and spherical particles. Inset shows the particle size histogram. (Panel b) Volume pore size distribution showing the narrow distribution spread and pore diameter of 31 Å or 3.1 nm in this particular embodiment.
Figure 7:
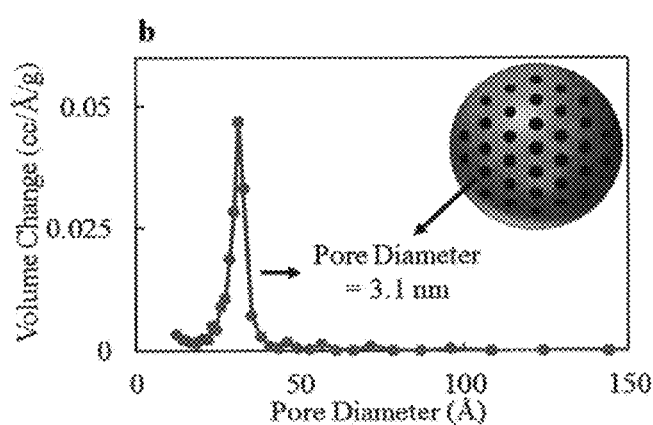

In some embodiments, mechanical testing of lab-scale specimens (as seen in FIG. 6) has been performed. FIG. 6 shows the nanoindentation results for the hardness and modulus values of an assembled film formed from a mixture of epoxy- and catalyst-loaded CSPPs. The average increase of the hardness and modulus after exposure to an external heat was over 900% and 60%, respectively. FIG. 7 shows the unusual uniformity of the produced particles (FIG. 7(a) almost identical particle sizes; FIG. 7(b) pore size distribution).

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present application as defined by the embodiments described herein.

What is claimed is:

1. Calcium-silicate based porous particles (CSPPs) comprising: a calcium-silicate structure, further comprising pores located on the CSPP's exterior surface; and an interior network of pores formed throughout the CSPP's structure, wherein the CSPPs are between 50 nanometer to 2 microns in average diameter, and wherein the CSPPs comprise a calcium to silicon atomic ratio of 0.05 to 2.0, and wherein the CSPPs comprise pores having an diameter size of 1-50 nanometers in average diameter and wherein the porous calcium-silicate structure is functionalized in the presence of functional groups selected from the group consisting of thamine groups, thiols, phosphines, hydrocarbon chains, and any combination thereof, and wherein said functional groups are functionalized on the inside surface, the outside surface, or both of the porous particles.

2. The CSPPs of claim 1, wherein at least a portion of the CSPPs are substantially spherical.

3. The CSPPs of claim 1, wherein the network of pores comprises a sealant loaded within the network, wherein the loaded sealant is selected from the group consisting of epoxy molecules, isocyanates, cyclic carboxylic anhydride, maleimide, polymer, initiator, hardener, reactant, catalyst, and any combinations thereof.

4. A composite of the CSPPs of claim 1, wherein the size of the CSPPs is substantially uniform within a standard deviation of about 6%.

5. A method of synthesizing CSPPs of claim 1 with controlled size, morphology, and composition, comprising the steps of:
   mixing an organic molecule with solvent(s) to form a homogenous organic molecule/solvent solution;
   mixing a synthesized base with the homogenous organic molecule/solvent solution to form a homogenous base/organic molecule solution;
   mixing a calcium source with the homogenous base/organic molecule solution to form a homogenous calcium/base/organic molecule solution;
   mixing a silicon source to the homogenous calcium/base/organic molecule solution to form a homogenous calcium-silicate/base/organic molecule solution;
   retrieving the product from the homogenous calcium-silicate/base/organic molecule solution;
   and separating a substantial portion or more of the organic molecules from the retrieved product to obtain calcium-silicate porous particles.

6. The method of claim 5, wherein the base is selected from the group consisting of ammonium hydroxide, sodium hydroxide, potassium hydroxide, L-Lysine, D-Lysine, amino acids and combinations thereof.

7. The method of claim 6, wherein the base concentration is in the range of 0.001-10 M.

8. The method of claim 5, wherein the organic molecules are selected from the group consisting of cetyltrimethylammonium bromide (CTAB), dodecyltrimethylammonium bromide (DTAB), decyltrimethylammonium bromide, zwitterion surfactant, anionic surfactants and combinations thereof.

9. The method of claim 5, wherein the solvent(s) is selected from the group consisting of water, tert-butanol, 1- and 2-butanol, 1- and 2-propanol, ethanol, methanol, acetone, acetonitrile, and combinations thereof.

10. The method of claim 5, wherein the silicon source is selected from the group consisting of tetraethyl orthosilicate (TEOS), tetramethyl orthosilicate (TMOS), tetrapropyl orthosilicate (TPOS), tetrabutyl orthosilicate, potassium metasilicate, sodium metasilicate, (3-aminopropyl)triethoxysilane (APTES) and combinations thereof.

11. The method of claim 5, wherein the base, organic molecule, and solvent(s) mixture is heated between 1-100° C.

12. The method of claim 5, wherein the calcium source is selected from the group consisting of calcium nitrate, calcium chloride, calcium oxide, or any other calcium (+2) ion sources, or any other hydrated version of these sources, and combination thereof.

13. The method of claim 5, further comprising forming loaded particles by steps comprising:
   mixing the obtained calcium-silicate porous particles with excess sealant or an excess sealant/solvent(s) mixture under conditions sufficient to form calcium-silicate particles loaded with sealant within its pores.

14. The method of claim 13, wherein the sealant is selected from the group consisting of epoxy molecules, isocyates, carboxylic anhydride, maleimide, polymer, initiator, hardener, reactant, catalyst, and any combinations thereof.

15. A method of using the CSPPs of claim 1, comprising:
   introducing into the CSPPs an external agent, wherein the external agent functionalizes the CSPPs;
   applying the functionalized CSPPs to a material, wherein the material is either biological or structural material; and
   subjecting the material to one or more external stimuli under conditions sufficient to trigger the functionalized CSPPs to release the external agent, wherein the external stimuli are selected from the group consisting of heat, pressure, pH, crack, light, chemical attacks, magnetic field, electric field, and the combination thereof.

16. A method of using the loaded CSPPs of claim 3, comprising:
   mixing the loaded CSPPs with Portland cement (type I, II, III, IV and V and white cement), well cement (class A, B, C, G and H), calcium-aluminate cement and the combination thereof to form a primary cement mix, wherein the CSPPs are an additive at a 0.01-99% weight ratio; and then either
   (a) pouring the primary cement mix into roads, highways, buildings, and other construction applications to form a self-healing cement or sealing agent; or
   (b) using the primary cement mix as a a self-healing cement or sealing agent in a well; and
   (c) using the primary cement mix for remedial applications, including sealing cracks of roads, highways, buildings, and other construction applications and/or remedial cementing in wells.

17. A method of using the CSPPs of claim 3, comprising:
   mixing the loaded CSPPs with water or other solvent as a carrier to form a remedial CSPP mix; and then
   (a) using the remedial CSPP mix in cracks of roads, highways, buildings, and other construction applications to seal and/or heal cracks or gaps; or
   (b) injecting the remedial CSPP mix into the cracks or defects of wellbores to perform remedial cementing; or
   (c) injecting the remedial CSPP mix into reservoir cracks induced by hydraulic fracturing to fill and heal the cracks; or
   (d) injecting the remedial CSPP mix as proppants for hydraulic fracturings.

18. A method of using the CSPPs of claim 3, comprising:
   mixing one part epoxy loaded CSPPs and one part catalyst loaded CSPPs and/or one part hardener loaded CSPPs to form a CSPP powder-type material;
   adding the CSPP powder-type material to water or another solvent and stirring to form a homogenous mix of CSPPs in solution; and then
   (a) applying the homogenous mix of CSPPs in solution to a material with a crack or other materially damaged site; or
   (b) adding the homogenous mix of CSPPs in solution to construction cement and concrete to form a homogenous CSPP/concrete mix and pouring the homogenous CSPP/concrete mix to form hardened structures or seal an existing structure; or
   (c) adding the homogenous mix of CSPPs in solution to well cement to form a homogenous CSPP/cement mix and pouring the homogenous CSPP/cement mix into wellbores for primary and/or remedial well cementing.

* * * * *